July 8, 1924.  
1,500,277  
H. SELKER  
SHOCK ABSORBER  
Filed July 23, 1921  
2 Sheets-Sheet 1

INVENTOR:  
HARRY SELKER  
BY George W. Saywell  
ATTORNEY

July 8, 1924. 1,500,277

H. SELKER

SHOCK ABSORBER

Filed July 23, 1921 2 Sheets-Sheet 2

INVENTOR:
HARRY SELKER
BY
George W. Saywell
ATTORNEY

Patented July 8, 1924.

1,500,277

UNITED STATES PATENT OFFICE.

HARRY SELKER, OF CLEVELAND, OHIO.

SHOCK ABSORBER.

Application filed July 23, 1921. Serial No. 486,967.

*To all whom it may concern:*

Be it known that I, HARRY SELKER, a citizen of the United States, resident of Cleveland, county of Cuyahoga, and State of Ohio, have invented new and useful Improvements in Shock Absorbers, of which the following is a specification, the principle of the invention being herein explained, and the best mode in which I have contemplated applying that principle, so as to distinguish it from other inventions.

My invention relates to shock absorbers and particularly to apparatus of this character adapted for use upon vehicles. For the purposes of illustration, I have shown in the accompanying drawings, and shall hereinafter describe, certain forms of shock absorbers illustrating my invention and applied to automobiles. The invention relates to a fluid shock absorber having braking action in both directions of piston movement, in which the leakage or loss of liquid between relatively movable parts is reduced to a minimum, in which even this slight leakage is compensated for, and in which the piston is centrally actuated so that a balanced application of power thereon is produced, also obviating the entrance of dust between moving parts or abrasion of said parts. The accompanying drawings illustrate an application of the principle of my invention in a liquid shock absorber; but the principle is likewise applicable in a construction in which gas is utilized if the several parts of the mechanism are properly relatively proportioned.

The annexed drawings and the following description set forth in detail certain means embodying my invention, the disclosed means, however, constituting but a few of the various forms in which the principle of the invention may be employed.

In said annexed drawings:

Figure 1 represents a fragmentary side elevation of an automobile chassis, an axle and a suspension spring secured thereto, my improved shock absorber secured to the chassis, and means for connecting the shock absorber to the axle housing;
Figure 2 represents a side elevation, upon an enlarged scale, of my improved shock absorber;

Figure 3 represents a vertical longitudinal section, taken in the planes indicated by the lines III—III, Figure 6;

Figures 4 and 5 represent, respectively, end elevations, taken from the respective planes indicated by the lines IV—IV, and V—V, Figure 3;

Figure 6 represents a central transverse vertical section, taken in the plane indicated by the line VI—VI, Figure 3;

Figures 7 and 8 represent vertical longitudinal sections, taken in the planes indicated by the respective lines VII—VII, and VIII—VIII, Figure 6;

Figure 9 represents a vertical transverse section, taken in the planes indicated by the line IX—IX, Figure 3;

Figure 10 represents a horizontal section, taken in the plane indicated by the line X—X, Figure 3;

Figure 10$^a$ represents a horizontal section, taken in the plane indicated by the line X$^a$—X$^a$, Figure 3;

Figure 12:
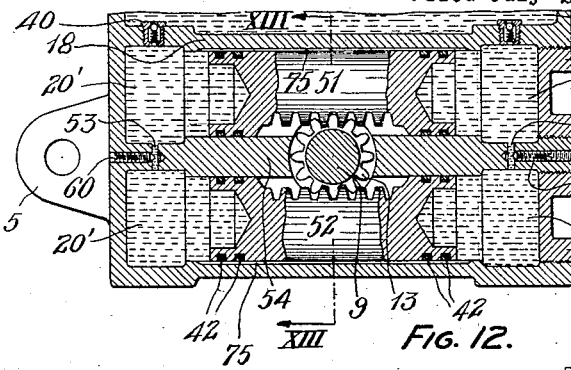
Figure 13:
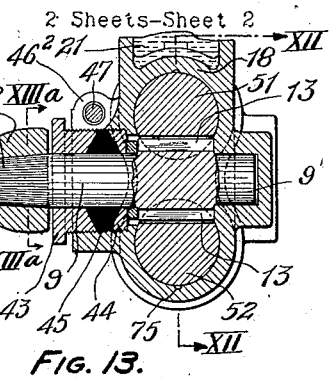
Figure 13A:
Figure 14:
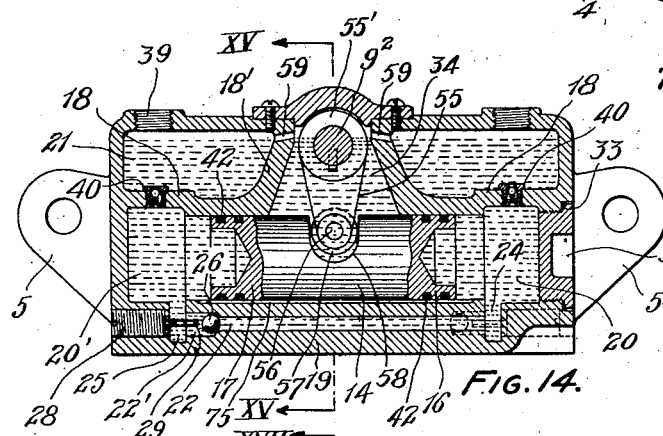
Figure 15:
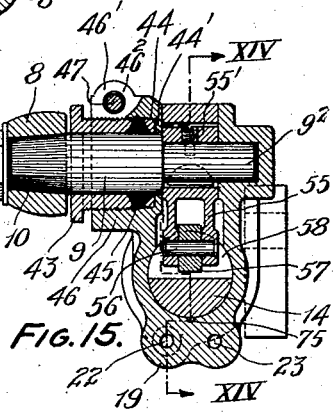
Figure 16:
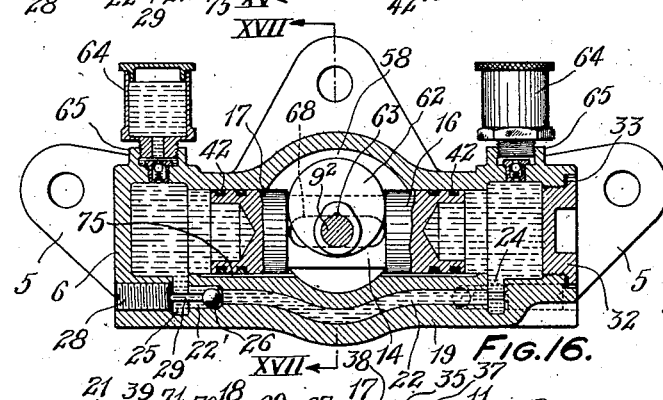
Figure 17:
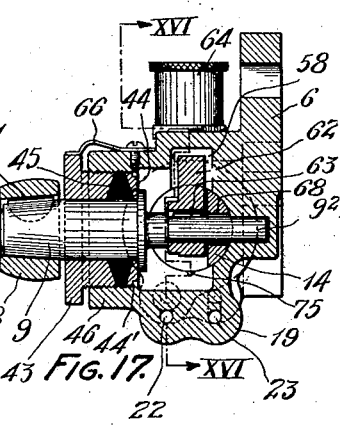
Figure 18:
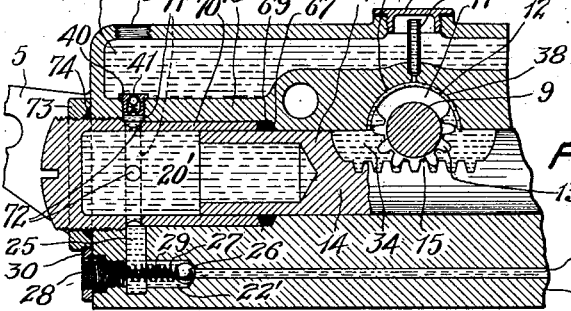

Figure 11 represents a fragmentary vertical longitudinal section, upon an enlarged scale, showing in detail a ball-control valve;

Figure 12 represents a fragmentary section, similar to Figure 3, taken in the plane indicated by the line XII—XII, Figure 13, illustrating a modified form of my invention, the same being a two-piston type;

Figure 13 represents a transverse vertical section, taken in the plane indicated by the line XIII—XIII, Figure 12;

Figure 13$^a$ represents a vertical longitudinal section, taken in the plane indicated by the line XIII$^a$—XIII$^a$, Figure 13, illustrating a modified way of connecting a shaft forming part of the absorber to the movable body whose shocks are to be absorbed;

Figure 14 represents a second modified form, the same being of a lever and roller type, the view being a vertical longitudinal section, taken in the planes indicated by the line XIV—XIV, Figure 15;

Figure 15 represents a vertical transverse section, taken in the plane indicated by the line XV—XV, Figure 14;

Figure 16 represents a third modified form, of the eccentric type, the view being a vertical longitudinal section, taken in the planes indicated by the line XVI—XVI, Figure 17;

Figure 17 represents a vertical transverse section, taken in the plane indicated by the line XVII—XVII, Figure 16; and Figure 18 represents a modified form in which improved means are shown for taking up the wear in compressible rings surrounding the moving piston.

Referring to the annexed drawings in which the same parts are indicated by the same respective ordinals in the several views, the chassis of an automobile is indicated by the ordinal 1, a suspension spring thereof by the ordinal 2, and an axle housing mounted upon the spring 2 by the ordinal 2'. By means of lugs 5 and bolts 5' the casing 6 of my improved shock absorber is rigidly secured to the chassis 1. The connections between the casing 6 and the axle housing 2' consist of a shaft 9 intersecting the casing wall, a lever 4 rotatably secured to said shaft 9, and a link 3 having a universal joint connection with the axle housing 2', the outer ends of the links 3 and 4 being secured together so as to be capable of a relative universal movement. This detail is all plainly shown in Figure 1 and comprises the means for connecting the absorber to the axle or other movable body whose shocks or abrupt movements are to be absorbed. Of course, these connecting means might be secured directly to the spring 2 or any other suitable movable body that directly receives the impact of the road obstruction or the jolt occasioned by a rut in the roadway.

The shaft 9 has a bearing at its inner end 9' in the wall of the casing 6 opposite the intersected wall heretofore mentioned, and is formed at its outer end with a portion 10 having external splines, Figures 6 and 8. The link 4 is formed with a hub portion 8 having internal splines adapted to co-operate with the splines 10. The particular construction of spline arrangement shown in Figures 6 and 8 is formed by machining a tapered hole 8' in the hub 8 and machining a plurality of spaced similar grooves in the wall surrounding the hole 8', the base of the grooves lying in the periphery of the cylinder formed by the rotation of the plane of the largest diameter of the hole. The portion 10 of the shaft 9 is substantially the same diameter as the largest diameter of the hole 8' and is milled to form a plurality of external alternate grooves and tongues complementary to the internal grooves and tongues of the hub member 8. This construction affords a very accurate driving fit between the link 4 and the shaft 9 which, however, can be adjusted as desired by relatively shifting the hub and shaft to cause different grooves and tongues to interlock. As plainly shown in Figure 6, the link 4 is held to the shaft 9 by means of the nut 7. The assembly of these parts will be hereinafter described. Intermediate its ends the shaft 9 is formed with an enlarged portion in the form of a block 11 and in the vertical planes of this block the shaft 9 is formed with downwardly projecting teeth 13, forming a gear segment. The casing 6 is formed with a partition wall 18 forming a piston chamber 20—20' and an upper and second chamber 21. It will be noted that the partition 18 is formed with a recess 12 adapted to accommodate the block 11 of the shaft 9. Within the chamber 20—20' which, in the form of device illustrated, is a cylindrical chamber, is accommodated a plunger 14 of a length considerably less than the length of the piston chamber and having end piston portions 16 and 17, the central part of said plunger 14 being of about one-half the depth of the end pistons, thus forming a central chamber 34, this part of the plunger 14 being formed with upwardly extending teeth 15 forming a rack adapted to co-operate with the gear segment 13 of the shaft 9. The piston 14 thus divides the piston chamber into a plurality of compartments; two compartments 20 and 20', in the form of device illustrated. It is evident that any movement of the axle housing 2' will be translated into a movement in one or the other direction of the piston 14 and that the latter will be acted upon centrally both longitudinally and transversely.

The casing 6 is formed with a thickened lower wall 19 within which are formed a plurality of conduits, two conduits 22 and 23, as shown in the form of device illustrated, of restricted cross-sectional area. These conduits communicate by means of passages 24 and 25 with the respective right hand and left hand ends 20 and 20' of the piston chamber and form throttling means for the piston movements. By means of spring-actuated ball-control valves 26—27 disposed in enlarged chambers 22' and 23' forming parts of the restricted conduits 22 and 23, respectively, fluid-transfer from the chamber 20 to the chamber 20' is permitted through the conduit 22 when the plunger 14 moves from left to right, communication through the conduit 23, in this event, being prevented, or, vice versa, transfer from the chamber 20' to the chamber 20 is permitted through the conduit 23 and prevented through the conduit 22, when the piston 14 moves from right to left, Figure 3. Plugs 28 having stems 29 intersect the end walls of casing 6, adjustably limit the opening movement of the balls 26, and are locked by means of nuts 30, leakage being obviated by means of the compression rings 31.

The casing-openings from the compartments 20—20' are closed by externally-threaded plugs 32, leakage being prevented by compression rings 33. The filling casing-opening for the chamber 21 is closed by an externally-threaded plug 35, leakage being prevented by means of a compression ring 36. The chamber 34 formed in the plunger 14 communicates with the upper chamber 21 by means of a tubular open-ended member 37 intersecting the partition 18, extended upwardly through the chamber 21 and communicating at the bottom with a pair of curved channels 38 opening into the chamber 34. The relief afforded by this means of communication between the chambers 34 and 21 obviates the building up of pressure in the chamber 34 during the reciprocatory movements of the piston 14.

The chamber 21 is utilized for a reserve supply of fluid to compensate for the leakage past the compression rings 42 secured externally of the plunger parts 16 and 17. This chamber 21 is filled by means of casing-opening closed by plug 35. It communicates with the compartments 20—20' in the event of a drop in pressure in either of the latter, by means of openings in the partition 18 which are closed by externally-threaded plugs 40 provided with spring-control ball valves 41 opening toward the compartments 20—20'. Casing openings 39 permit the drilling and tapping of the holes for the plugs 40.

The casing 6 is counterbored and tapped to receive an internally and externally-threaded ring 44 having a thrust collar portion 44', an externally-threaded plug 43 engaging the ring 44 and a compression member 45 being disposed intermediate the plug 43 and the collar 44', all as plainly shown in Figure 6. The casing 6 is further recessed to receive the inner end 9' of the shaft 9 and the block 11. The collar 44' lies adjacent the block 11, as plainly shown in Figure 6. The compression member 45 prevents leakage through the threads of the plug 43 and also along shaft 9. The collar 44' is held rigidly by means of the screw-threaded connection in casing 6 of the ring 44. In order tightly to lock the ring 44, I split the casing member 46 surrounding and accommodating the ring 44, as indicated at 46', Figure 7, and provide ears 46² upon the member 46, upon each side of the area 46', and a screw 47 intersecting said ears 46². I rigidly lock the plug 43 in any desired position by means of a spring clip 46³. By the means shown I am enabled conveniently to adjust the plug 43 to take up any wear in the compression member 45. When assembling these elements, the shaft 9 including the block 11 is first positioned in the casing, as shown in Figure 6, the plunger 14 having already been positioned in the cylindrical chamber formed intermediate the partition wall 18 and the thickened bottom wall 19, and then the ring 44 and compression member 45 are inserted and the plug 43 then threaded into the ring 44 to secure the desired compression of the member 45. The ring 44 is then locked to position by means of the ears 46² and screw 47, the plug being held by the clip 46³. The hub 8 is then positioned over the portion 10 of the shaft 9 and locked by means of the nut 7.

In order that the normal benefits of spring action may not be lost, through the use of my shock absorber, during the usual and constant slight jolts to which a vehicle is subjected when running on the ordinary pavement, I provide a by-pass for fluid between the two compartments 20—20'. This by-pass is regulated so as to be effective for only a limited amount of piston movement in either direction; so that if a shock occurs greater than is necessary to cause this predetermined amount of piston movement, then the by-pass action is eliminated, the absorber is called into play and the spring action correspondingly throttled. In the form of device illustrated, this by-pass takes the form of a groove 75 formed in the wall of the piston chamber and terminating in the respective compartments 20 and 20' at points somewhat distant from the ends of the piston 14, when the latter is in its central position, and also substantially distant from and within the extreme limits of travel of the piston ends so that the piston will cut off the transfer of fluid through the groove 75 when the piston has travelled a predetermined distance, according to the setting of the mechanism. This is all plainly shown in Figure 3.

Referring to Figures 12 and 13, there is shown a two-piston type of my shock absorber, the separate pistons being indicated by the ordinals 51 and 52. It is evident that the rotation of the shaft 9 in either direction will actuate one piston in one direction and the other piston in the opposite direction and that there will be through the passages 53 a mutual transfer of liquid to and from the chambers 20 and 20'. In this construction I provide, in addition to the upper partition wall 18, a second partition wall 54 forming the two chambers for the pistons 51 and 52, in which partition wall the passages 53 are formed. The capacity of the passages 53 is regulated by means of adjusting screws 60. Referring particularly to Figure 13ª, it will be noted that in this form of construction I have illustrated a simple arrangement of spline construction connecting the link 4 and the hub 8 and consisting of alternate tapered tongues and grooves of uniform depth.

Referring to the form of my invention shown in Figures 14 and 15, the same is a lever and roller type in which there is secured to a reduced inner end portion 92 of the shaft 9 the hub member 55' of a doublearmed lever 55 upon the outer end of which is mounted a roller 57 by means of a pin 56. In this form, the plunger 14 is formed with a recess 58 against the walls of which the roller 57 presses, as the shaft 9 is rotated, to actuate the plunger 14. Furthermore, the partition 18 is formed with an upwardly extended tubular neck 18′ in which are formed passages 59 providing liquid transfer from chamber 34 to compensating chamber 21.

The form of device shown in Figures 16 and 17 is an eccentric type. Furthermore, I utilize a key 61 and co-operating key-way for securing the arm 4 to the shaft 9, instead of the male and female splines shown in Figure 6. To the reduced end portion 9² of the shaft 9 is secured an eccentric 62 by means of a key and key-way 63, said eccentric being disposed adjacent the inner walls of the piston portions 16 and 17, and adapted to extend up into a recess 58 formed in the casing 5. Relative movement of the shaft 9 and piston 14 is allowed by means of a slot 68 formed in the piston. In this form of device, instead of providing a chamber 21 formed in the casing 6 for holding the compensating liquid, I have formed a pair of bosses 65 upon the top of the casing 6 adapted to accommodate the externally-threaded tubular stems of a pair of cups 64 forming reserve chambers. In this form of device no provision is made for liquid transfer from the chamber 58 to the cups 64. Furthermore, in this form of device, I have shown the plug 43 locked by means of a spring 66 secured at its inner end to the member 46 surrounding the ring 44, compressible member 45 and plug 43.

In the form of device shown in Figure 18, I have shown means for reducing to a minimum the leakage past the plunger portions 16 and 17 from the chambers 20 and 20′ to the chamber 34. I accomplish this by providing means for taking up the wear in the compression members surrounding the piston portions 16 and 17. In this form I have indicated these compression rings by the ordinal 69 and they are tightly held to shoulders 67 formed in the partition 18 and thickened wall 19 by means of annular-bodied screws forming tubular plugs 70 adapted to replace the plugs 32 shown in Figure 3 for the purpose of closing the open ends of the cylindrical chamber in which the piston 14 reciprocates. In order to provide for the flow of the compensating liquid from the reserve chamber 21 to the chambers 20 and 20′, I form a channel 71 around the plug 70, which channel upon opposite sides of the plug 70 is deepened into holes 72 passing through the plug 70 and providing for liquid transfer to the chambers 20 and 20′. For the purpose of locking the plug 70 and for preventing leakage through the threads of the same, I provide the lock-nut 73 and the compression ring 74. I have found this form of device shown in Figure 18 very efficient for preventing leakage along the piston 14 from the chambers 20 and 20′ to the chamber 34 because of the ability to take up the wear in the compression ring 69 by the means shown.

What I claim is:

1. In a fluid shock absorber, the combination of a casing having a cylindrical chamber; a piston adapted to reciprocate in said chamber and dividing the same into a plurality of compartments; means providing a plurality of conduits of restricted cross-sectional area each communicating with a plurality of said compartments; means preventing fluid-transfer through some of said conduits in one direction of movement of the piston and through the other of said conduits in the other direction of movement of the piston; and shock-transmitting means connected to the movable body whose shocks are to be absorbed and acting upon the piston.

2. In a fluid shock absorber, the combination of a casing having a cylindrical chamber; a piston adapted to reciprocate in said chamber and dividing the same into a plurality of compartments; means providing a plurality of conduits of restricted cross-sectional area each communicating with a plurality of said compartments; means preventing fluid-transfer through some of said conduits in one direction of movement of the piston and through the other of said conduits in the other direction of movement of the piston; and shock-transmitting means connected to the movable body whose shocks are to be absorbed and acting upon the piston centrally, both longitudinally and transversely.

3. In a fluid shock absorber, the combination of a casing having a cylindrical chamber; a piston adapted to reciprocate in said chamber and dividing the same into a plurality of compartments; means providing a plurality of conduits of restricted cross-sectional area each communicating with a plurality of said compartments; means preventing fluid-transfer through some of said conduits in one direction of movement of the piston and through the other of said conduits in the other direction of movement of the piston; a shaft intersecting the casing wall and provided with a gear segment; a complementary gear member secured to the piston; and means for connecting the shaft to the movable body whose shocks are to be absorbed.

4. In a fluid shock absorber, the combination of a casing having a cylindrical chamber; a piston adapted to reciprocate in said chamber and dividing the same into a plurality of compartments; means providing a plurality of conduits of restricted cross-sectional area each communicating with a plurality of said compartments; means preventing fluid-transfer through some of said conduits in one direction of movement of the piston and through the other of said conduits in the other direction of movement of the piston; a shaft intersecting the casing wall and provided with a gear segment; a complementary gear member secured to the piston, the construction being such that the piston is acted upon centrally, both longitudinally and transversely; and means for connecting the shaft to the movable body whose shocks are to be absorbed.

5. In a fluid shock absorber, the combination of a casing having a cylindrical chamber; a piston adapted to reciprocate in said chamber and dividing the same into two compartments; means providing a plurality of conduits of restricted cross-sectional area each communicating with both of said compartments; means preventing fluid-transfer through some of said conduits in one direction of movement of the piston and through the other of said conduits in the other direction of movement of the piston; and shock-transmitting means connected to the movable body whose shocks are to be absorbed and acting upon the piston.

6. In a fluid shock absorber, the combination of a casing having a cylindrical chamber; a piston adapted to reciprocate in said chamber and dividing the same into two compartments; means providing a plurality of conduits of restricted cross-sectional area each communicating with both compartments; means preventing fluid-transfer through some of said conduits in one direction of movement of the piston and through the other of said conduits in the other direction of movement of the piston; a shaft intersecting the casing wall and provided with a gear segment; a complementary gear member secured to the piston; and means for connecting the shaft to the movable body whose shocks are to be absorbed.

7. In a fluid shock absorber, the combination of a casing having a cylindrical chamber; a piston adapted to reciprocate in said chamber and dividing the same into a pair of compartments; means providing restricted fluid-transfer between said compartments; a shaft intersecting the casing wall; means for translating the rotation of the shaft into piston movements, the construction being such that the piston is acted upon centrally, both longitudinally and vertically whereby a balanced application of power thereon results; and means for connecting the shaft to the movable body whose shocks are to be absorbed.

8. In a fluid shock absorber, the combination of a casing having a cylindrical chamber; a piston adapted to reciprocate in said chamber; means providing restricted fluid-transfer between the ends of said chamber; means forming a compensating fluid supply chamber; means providing fluid communication between said supply chamber and the respective ends of said cylindrical chamber and opening toward said ends; and shock-transmitting means connected to the movable body whose shocks are to be absorbed and acting upon the piston.

9. In a fluid shock absorber, the combination of a casing having a cylindrical chamber; a reciprocatory piston; means providing restricted fluid-transfer between the ends of said chamber; means forming a compensating fluid supply chamber; check valves providing fluid communication between said supply chamber and the respective ends of said cylindrical chamber and opening toward said ends; and shock-transmitting means connected to the movable body whose shocks are to be absorbed and acting upon the piston.

10. In a fluid shock absorber, the combination of a casing having a cylindrical chamber; a piston adapted to reciprocate in said chamber; means providing restricted fluid-transfer between the ends of said chamber; a chamber formed centrally of the piston; a shaft intersecting the casing wall and said piston chamber; motion-translating means positioned in said piston chamber; means forming a compensating fluid-supply chamber, said last-named chamber having communication with said piston chamber; check valves providing fluid communication between said supply chamber and the respective ends of said cylindrical chamber and opening toward said ends; and means for connecting the shaft to the movable body whose shocks are to be absorbed.

11. In a fluid shock absorber, the combination of a casing formed with a cylindrical chamber; a piston adapted to reciprocate in said chamber; means providing restricted fluid-transfer between the ends of said chamber; a shaft; means for translating the rotation of the shaft into piston movements; means for connecting the shaft to the movable body whose shocks are to be absorbed; a compression ring surrounding each end of the piston; abutments adjacent which said rings lie; chambered end plugs intersecting the casing walls and adapted to take up the wear in said rings; and locking means for said plugs.

12. In a fluid shock absorber, the combination of a casing formed with a cylindrical chamber; a piston adapted to reciprocate in said chamber; means providing restricted fluid-transfer between the ends of said chamber; a shaft; means for translating the rotation of the shaft into piston movements; means for connecting the shaft to the movable body whose shocks are to be absorbed; a compression ring surrounding each end of the piston; shoulders formed in the casing and adjacent which said rings lie; annular-bodied screws forming end plugs engaging the casing end walls and adapted to take up the wear in said rings; and lock nuts for said screws.

13. In a fluid shock absorber, the combination of a casing having a cylindrical chamber; a piston adapted to reciprocate in said chamber; means providing restricted fluid transfer between the ends of said chamber and consisting of a pair of independent fluid passages each connected to the ends of said chamber; valves preventing fluid-transfer through one of said passages in one direction of movement of the piston and through the other of said passages in the other direction of movement of the piston; and shock-transmitting means connected to the movable body whose shocks are to be absorbed and acting upon the piston.

14. In a fluid shock absorber, the combination of a casing formed with a cylindrical chamber and having a thickened wall; a piston adapted to reciprocate in said chamber; a pair of fluid passages formed in said wall and communicating each with both ends of said chamber; means preventing fluid transfer through one of said passages in one direction of movement of the piston and through the other of said passages in the other direction of movement of the piston; and piston actuating means connected to the movable body whose shocks are to be absorbed.

15. In a fluid shock absorber, the combination of a casing having a partition wall forming a cylindrical chamber and an auxiliary chamber; a piston adapted to reciprocate in said cylindrical chamber; check valves in said partition wall opening toward both ends of said cylindrical chamber; means permitting fluid-transfer through said partition wall from an area in said cylindrical chamber intermediate the piston ends; a shaft intersecting the casing wall; means for translating the rotation of the shaft into piston movements; and means for connecting the shaft to the movable body whose shocks are to be absorbed.

16. In a fluid shock absorber, the combination of a casing formed with a cylindrical chamber; a piston adapted to reciprocate in said chamber, means providing restricted fluid-transfer between the ends of said casing; a shaft intersecting the cylinder wall; a chamber formed intermediate of the piston ends into which the shaft projects; means for translating the rotation of the shaft into piston movements; a stuffing box for said shaft; means affording pressure relief in said chamber interiorly of said stuffing box; and means for connecting the shaft to the movable body whose shocks are to be absorbed.

17. In a fluid shock absorber, the combination of a casing having a partition wall forming a cylindrical chamber and an auxiliary chamber; a piston adapted to reciprocate in said cylindrical chamber; check valves in said partition wall opening toward both ends of said cylindrical chamber; a shaft intersecting the casing wall and projecting into said cylindrical chamber; means for translating the rotation of the shaft into piston movements; a stuffing box for said shaft; means affording pressure relief in said chamber interiorly of said stuffing box; and means for connecting the shaft to the movable body whose shocks are to be absorbed.

18. In a fluid shock absorber, the combination of a casing formed with a cylindrical chamber and having a thickened wall; a piston adapted to reciprocate in said chamber; a pair of fluid passages formed in said wall and communicating each with both ends of said chamber; spring-control ball valves, one in each of said passages, and opening in opposite directions; and piston-actuating means connected to the movable body whose shocks are to be absorbed.

19. In a fluid shock absorber, the combination of a casing formed with a cylindrical chamber; a piston adapted to reciprocate in said chamber; means providing restricted fluid-transfer between the ends of said chamber; a chamber formed centrally of the piston; piston-actuating means disposed in said last-mentioned chamber; means forming a compensating fluid supply chamber; check valves providing fluid communication between said supply chamber and the respective ends of said cylindrical chamber and opening toward said ends; and means for connecting the piston-actuating means to the movable body whose shocks are to be absorbed.

20. In a fluid shock absorber, the combination of a casing having a cylindrical chamber and having also a thickened side wall; a piston adapted to reciprocate in said chamber; a pair of fluid passages formed in said side wall and communicating each with both ends of said chamber; spring-control ball valves, one in each of said passages, and opening in opposite directions; a chamber formed in said piston and intermediate the ends of the latter; means permitting fluid-escape from said last-mentioned chamber; means providing fluid, compensating for the fluid that escapes; a shaft intersecting the casing wall and said piston chamber; means for translating the rotation of the shaft into piston movements; and means for connecting the shaft to the movable body whose shocks are to be absorbed.

21. In a fluid shock absorber, the combination of a casing having a thickened bottom wall and an upper partition wall forming a chamber therebetween, a compensating fluid supply chamber being formed above said partition wall; a reciprocatory piston in said first-mentioned chamber; check valves in said partition wall opening toward both ends of said first-mentioned chamber; means permitting fluid-transfer through said partition wall from an area in said first-mentioned chamber intermediate the piston ends; a pair of fluid passages formed in said thickened wall and communicating each with both ends of said first-mentioned chamber; spring-control ball-valves, one in each of said passages, and opening in opposite directions; and piston actuating means connected to the movable body whose shocks are to be absorbed.

22. In a fluid shock absorber, the combination of a casing having a partition wall forming a cylindrical chamber and an upper reserve chamber for compensating liquid; a piston adapted to reciprocate in said cylindrical chamber; check valves in said partition wall opening toward both ends of said cylindrical chamber; means permitting fluid-transfer through said partition wall from an area in said cylindrical chamber intermediate the piston ends, said means including a tubular open-ended member extending upwardly through said reserve chamber; a shaft intersecting the cylinder wall; means for translating the rotation of the shaft into piston movements; and means for connecting the shaft to the movable body whose shocks are to be absorbed.

23. In a fluid shock absorber, the combination of a casing having a cylindrical chamber; a piston adapted to reciprocate in said chamber; means providing restricted fluid-transfer between the ends of said chamber; a shaft intersecting the casing wall; a ring surrounding said shaft, spaced from the latter, and removably secured in the cylinder wall; a compression ring disposed intermediate said shaft and said first-mentioned ring, said first-mentioned ring being formed with a collar adjacent which the inner end of said compression ring lies; an externally-threaded plug engaging said first-mentioned ring and adapted to take up wear in said compression ring; and means for connecting the shaft to the movable body whose shocks are to be absorbed.

24. In a fluid shock absorber, the combination of a casing formed with a cylindrical chamber; a piston adapted to reciprocate in said chamber and dividing the same into a pair of compartments; means providing restricted fluid-transfer between said compartments; piston actuating means connected to the movable body whose shocks are to be absorbed; a by-pass between said compartments; and means for closing said by-pass after a predetermined maximum movement of the movable body.

25. In a fluid shock absorber, the combination of a casing formed with a cylindrical chamber; a piston adapted to reciprocate in said chamber and dividing the same into a pair of compartments; means providing restricted fluid-transfer between said compartments; secondary means providing fluid-transfer between said compartments for a limited predetermined amount of piston movement in either direction; and piston actuating means connected to the movable body whose shocks are to be absorbed.

26. In a fluid shock absorber, the combination of a casing formed with a cylindrical chamber; a piston adapted to reciprocate in said chamber; means providing restricted fluid-transfer between the ends of said chamber; a secondary fluid passage-way communicating with both ends of the chamber, exteriorly of the piston ends, in the central position of the piston, and a predetermined distance from the extreme ends of the cylinder, so that the piston acts as a complete cut-off for said secondary passage way, after a pre-determined maximum movement of the piston; and piston-actuating means connected to the movable body whose shocks are to be absorbed.

27. In a fluid shock absorber, the combination of a casing formed with a cylindrical chamber; a piston adapted to reciprocate in said chamber; means providing restricted fluid-transfer between the ends of said chamber; a secondary fluid passage-way formed in the inner face of the chamber wall and communicating with both ends of the chamber, exteriorly of the piston ends, in the central position of the piston, and a predetermined distance from the extreme ends of the cylinder, so that the piston acts as a complete cut-off for said secondary passage way, after a pre-determined maximum movement of the piston; and piston-actuating means connected to the movable body whose shocks are to be absorbed.

28. In a fluid shock absorber, the combination of a casing formed with a cylindrical chamber; a piston adapted to reciprocate in said chamber; means providing restricted fluid-transfer between the ends of said chamber and consisting of a pair of independent fluid passages each connected to the ends of said chamber; valves preventing fluid transfer through one of said passages in one direction of movement of the piston and through the other of said passages in the other direction of the movement of the piston; means for independently, adjustably regulating the amount of fluid-transfer through said passages; and piston actuating means connected to the movable body whose shocks are to be absorbed.

29. A shock absorber comprising a casing having chambers adapted for the reception of a fluid, a rack having pistons arranged in said chambers, means engaging said rack and connected to the movable body whose shocks are to be absorbed, said casing being provided with a passage establishing communication between said chambers, and means whereby to obstruct said passage when the vehicle spring action exceeds a predetermined point.

Signed by me this 20th day of July, 1921.

HARRY SELKER.